April 3, 1928.  
C. W. WOODRUFF  
1,664,720
THERMO ELECTRIC GENERATOR
Filed Dec. 7, 1925
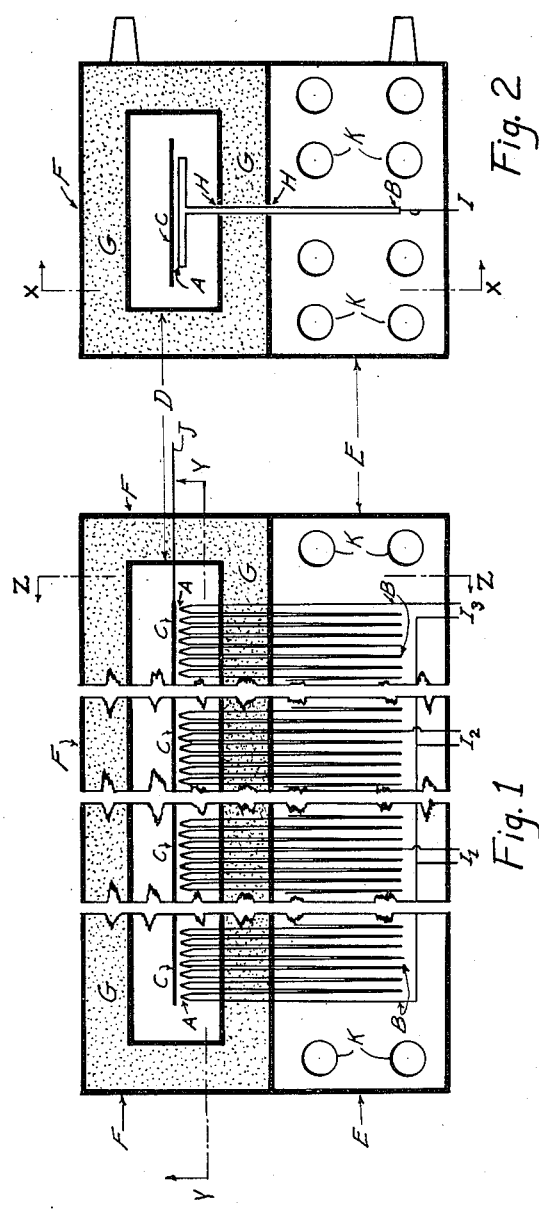
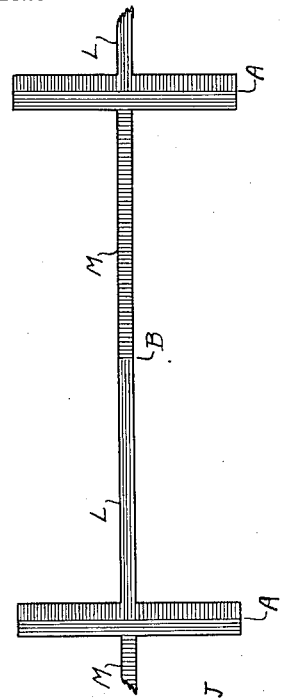
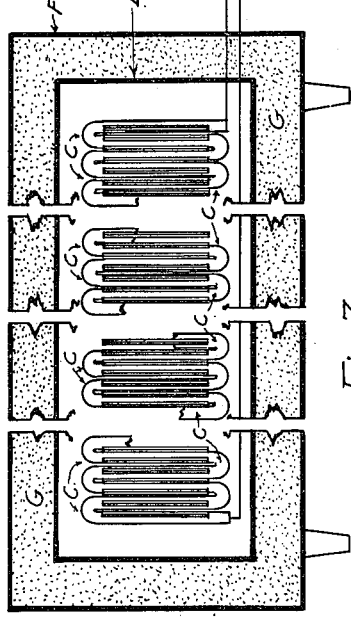
INVENTOR  
CHARLES W. WOODRUFF  
BY Ralph B. Stewart  
ATTORNEY.

Patented Apr. 3, 1928.

1,664,720

UNITED STATES PATENT OFFICE.

CHARLES W. WOODRUFF, OF COLUMBUS, OHIO.

THERMOELECTRIC GENERATOR.

Application filed December 7, 1925. Serial No. 73,937.

My invention relates broadly to a device for transforming heat energy into electrical energy.

More specifically my invention relates to a device for transforming alternating current or combustion energy into heat and utilizing this heat to generate direct current energy to be used as the supply for the filament and plate currents in vacuum tube circuits, or in any other situation where a steady source of direct current is required or useful.

Further, my invention relates to a method of manufacturing an improved element of a thermo-electric cell of the type employing hot and cold junctions of dissimilar metals.

An object of my invention is to produce an improved form of thermo-electric generator or cell in which the transformation from heat energy to electric energy is at very high efficiency.

Another object is to produce a thermoelectric cell having a high current capacity without employing an excessive temperature in the cell during transformation.

A further object of my invention is to produce an improved construction of a thermo-electric cell which will permit a ready transfer of a large amount of heat from the source of heat to the hot junction, but will minimize the amount of heat conducted or transferred from the hot junction to the cold junction.

A further object of my invention is to provide a method for the economical manufacture of thermo-electric couples for the generation of a steady direct current.

My invention is illustrated in the accompanying drawing, in which,

Fig. 1 is a plan view looking down upon the assembled device in section taken along the line X—X of Fig. 2.

Fig. 2 is an end view in section taken along line Z—Z of Fig. 1.

Fig. 3 is a side view in section taken along line Y—Y of Fig. 1.

Fig. 4 shows how the elements of my improved cell are made in a continuous strip by my improved method of manufacture.

Referring to the drawing, the cell comprises a thermo-pile consisting of a series of metallic couples, each couple comprising alternate strips of dissimilar metals joined at their ends in serial relation, and a heating element C, to heat alternate junctions, or the hot junctions A, of the pile. The cold junctions B are arranged as far as necessary away from the hot junctions and from the heating element. The heating element C is shown in Fig. 3 in the form of a resistance grid which is heated by current from any suitable source over wires J. The heating element C and the hot junctions A are suitably supported adjacent each other in a closed inner container D, made of any suitable heat resisting material. Container D is in turn enclosed within a compartment F of the main container, and the space between D and F is filled with a suitable heat insulating and heat resisting material G. The elements of the thermo-pile are suitably supported in insulated slots H—H formed in side walls of container D and compartment F. The cold junctions B extend into compartment E of the main container. The construction described above prevents the loss of heat by radiation, confining practically all the heat to container D, where it serves to heat the hot junction A, and it also prevents the temperature of cold junctions B from being raised by heat from the heating elements C. The hot junction A may be heated by a gas flame or other suitable source of heat.

Compartment E is perforated with holes K to provide a free circulation of air around the cold junctions in order that the difference in temperature between the hot and the cold junctions will be maintained as great as possible.

Each strip of dissimilar metal comprising the metallic couples is made in the form of a T, as shown in Fig. 2. Two of these strips of dissimilar metals are joined together at their upper ends, across the entire cross-portion of the T, to form a hot junction of one couple. The lower end of each strip is connected to the lower end of a strip of dissimilar metal of an adjacent couple to form a cold junction. The vertical portion of each strip is made as small as possible in order to reduce to a minimum the amount of heat conducted from the hot junction to the cold junction. The size of this vertical portion is dependent somewhat upon the amount of current which must be conducted over it without the generation of too much heat due to resistance. It is to be noted that by forming these elements in the form of a T as shown, the hot junction will have a comparatively large effective area which can be conveniently exposed to the heating element and will, accordingly, absorb a relatively large amount of heat, with the result that the current output of the cell will be many times that in case the hot junctions were mere point contacts.

By forming the couples with T shaped elements with the hot junction at the top, the contact area of the hot junction is increased many times over the case of contact between the ends of straight wires, and the electrical resistance of the hot junction is accordingly decreased. This results in a lower internal resistance and, therefore, a more efficient generator.

Due to the efficient transfer of heat to the large area of the hot junctions it is possible to obtain a large current output without maintaining a high temperature within the container D.

The T shaped strips of the thermo-pile may be made of any of the well known dissimilar metals used in the construction of thermo-piles, and their ends may be joined together in any desired manner, such as by a continuous or solid weld across the entire top portion of the T, by spot welding at spaced points along the top of the T, by crimping the two top portions together, or by depositing one metal upon the other.

The feature of my invention just described, that is, the feature of forming the elements in the shape of a T, is not limited to, nor dependent upon, the use of any particular materials nor any particular manner of joining them together.

While the metallic couples may be made of two separate T shaped strips of dissimilar metals joined together in the manner described above, they may also be formed in a continuous strip in a manner now to be described. I take a thin strip of metal of a width equal to the length of the top portion of the T and of a length equal to the combined length of all the elements constituting the pile, and I cut out portions of this strip to form the shape indicated in Fig. 4.

The central portion, running the whole length of the strip, is very narrow, and constitutes the vertical portions of all the T elements. The cross-portions are of a width equal to twice the width of the cross-portion of a T element, and these cross-portions are to constitute the joined cross-portions of adjacent T elements of unlike metals. I next treat this strip in a manner to convert different and adjacent portions into metals of dissimilar properties. For example, the portions indicated at L by horizontally ruled lines will constitute all the T elements of the strip corresponding to one dissimilar metal, and the portions indicated at M by vertically ruled lines will constitute all the T elements of the strip corresponding to the other dissimilar metal. The dissimilar metals constituting the elements of the couples may be either the combination of a pure metal and an alloy or the combination of two different alloys. In the case of a pure metal and an alloy, the alloy must be one capable of being formed from the pure metal constituting one of the elements; and, in the case of two different alloys, there must be at least one metal constituent common to the two alloys. Accordingly, in case the dissimilar metals are to be a pure metal and an alloy of that metal, I make the strip of the pure metal; and, in case the dissimilar metals are to be two different alloys, I make the strip of a metal which is a common constituent of the two alloys. Assuming that the dissimilar elements are to be a pure metal and an alloy of that metal, take, for example, the combination of the metal nickel (Ni) and a nickel-chromium alloy (90 Ni—10 Cr). In this case the strip will be formed of nickel, which is the metal of one of the elements, say L. The other element M, which is to be an alloy, is formed from the nickel strip in the following manner: The L portions are covered on all sides with paraffin or any other suitable material, leaving the M portions clean and exposed. Chromium is then deposited upon the surfaces of portions M in sufficient quantity to combine with the nickel and form the desired alloy. The chromium may be deposited upon the nickel by any suitable process, for example, by electro-plating. After depositing the chromium, the paraffin is removed, and the entire strip is placed in a suitable furnace or oven and heated to a proper temperature to cause complete diffusion of the nickel and chromium, thereby converting the portions M into an alloy of nickel and chromium. The strip is next folded along the junction lines A and B in such manner that all the hot junctions A are on one side of the pile and the cold junctions B on the other side, as shown in Fig. 1. The pile is now finished and ready to be mounted in its container. It is apparent that both portions L and M may be treated in the manner described above to form two different alloys, the strip being made of a metal which is common to both alloys.

In the foregoing description I use the term "pure metal" to distinguish from an alloy, not literally pure.

It is obvious that a metallic pile constructed in accordance with the foregoing process has many advantages: It is rugged and strong; the problem of making good contact between the dissimilar metals is not present; it has low internal resistance, and has other advantages in addition to the advantages derived by forming the elements in a T shape.

My improved method of manufacturing metallic couples is not limited in its application to the manufacture of elements of the T shape, but it is apparent that it may be applied in the manufacture of elements of any shape or form.

Under any given conditions each couple of the generator will generate a definite voltage, and by connecting a sufficient number of couples in series, any desired voltage can be obtained at the terminals. In Fig. 1, I have shown a series of terminals $I_1$, $I_2$ and $I_3$, which are tapped onto the pile at different points to include different numbers of couples, and will, accordingly, have different voltages across the terminals. As will be seen, $I_1$ is the low voltage tap, $I_2$ the intermediate, and $I_3$ the high voltage terminals including the whole pile. Any desired number of taps may be provided.

Due to the inherent high current capacity of my improved generator it is particularly well suited for use as a supply for the filament currents of vacuum tubes in any use, whether for receiving, transmitting, or other purposes. Also, due to the compactness of my generator, it is easily possible to obtain fairly high voltages and accordingly it is well suited for use as a supply for the plate current of vacuum tubes in any use, whether for the small current required in receiving sets or for the large currents required in power tubes in transmitting sets.

It is possible to arrange the terminals of a single generator so that it will supply all the current needed by the usual receiving set. For example, the tap on the low voltage terminals may be adjusted to the proper voltage to supply the filament current, the intermediate voltage terminals adjusted to supply the detector plate current and the high voltage terminals to supply the amplifier plate current. Since the heating element C may be heated from any suitable source of current or heat, it may be designed to operate from the ordinary house-lighting system, and the generator may be made into a convenient form and sold as a battery eliminator or battery substitute for use in radio sets or ignition systems, or for lighting, etc.

While I have described certain details of construction, and named certain specific metals in the foregoing description, it was by way of explanation of the invention and not by way of limitation. It is obvious that the details of construction, and the materials used, may be varied throughout wide limits without departing from the spirit of my invention.

I claim:

1. Elements of a thermo-electric generator comprising a homogeneous strip of base metal having different metals diffused therethrough in different portions thereof, said strip being relatively wide at alternate junctions of unlike portions and having narrow sections intermediate the wide junctions.

2. Elements of a thermo-electric generator comprising a homogeneous strip of base metal having different metals diffused there through in different portions thereof, said strip being relatively wide at alternate junctions of unlike portions and having narrow sections intermediate the wide junctions, said wide junctions constituting the hot junctions of said generator.

3. Elements of a thermo-electric generator comprising a homogeneous strip of base material having different metals diffused therethrough in different linear portions thereof, alternate junctions of unlike portions constituting hot junctions of the generator, the remaining junctions constituting the cold junctions, said strip having reduced cross-sectional area intermediate the hot and cold junctions to reduce the transmission of heat between said junctions.

4. A thermo-pile comprising a series of aligned hot junctions forming a heat receiving surface, a series of aligned cold junctions, and a portion connecting said hot and cold junctions having cross sectional area smaller than the heat receiving surface, said thermopile being formed of a single strip of material folded in zig-zag manner to present the hot and cold junctions on opposite sides of the pile.

5. Elements of a thermo-electric generator comprising a homogeneous strip of base metal having an unlike metal diffused therethrough in a portion thereof.

6. Elements of a thermo-electric generator comprising a homogeneous strip of base metal having an unlike metal diffused therethrough in alternate portions thereof.

7. Elements of a thermo-electric generator comprising a homogeneous strip of base metal having different metals diffused there through in different portions thereof, said portions constituting respectively the positive and negative elements of the generator.

8. Elements of a thermo-electric generator comprising a homogeneous strip of base metal having an unlike metal diffused therethrough in alternate portions thereof, and a second unlike metal diffused therethrough in adjacent alternate portions.

9. The method of making a generating element of a thermo-electric generator which consists in forming the element of a metal and diffusing a different metal throughout a portion of the element.

10. The method of making a generating element of a thermo-electric generator which consists in forming both positive and negative portions of the element of a continuous piece of base metal and diffusing a metal throughout one of the portions thereof.

11. The method of making an element of a thermo-electric generator which consists in forming the element of a base metal into the desired shape and diffusing therethrough a different metal.

12. The method of making an element of a thermo-electric generator which consists in forming the element into the desired shape from a base metal, depositing upon the element a different metal and heating the element to cause diffusion of the metals.

13. The method of making the generating unit of a thermo-electric generator which consists in forming the elements of the unit in the form of a continuous strip of metal, depositing a different metal on alternate portions of the strip and heating the strip to cause diffusion of the metals.

14. The method of making the generating unit of a thermo-electric generator which consists in forming the unit in a continuous strip of metal, depositing a different metal upon alternate portions thereof, heating the strip to cause diffusion of the metals, depositing a second different metal upon the remaining portions of the strip, and heating the strip to cause diffusing of the metals.

15. The method of making the generating unit of a thermo-electric generator which consists in forming the elements of the unit in the form of a continuous strip of metal, depositing a different metal on alternate portions of the strip, heating the strip to cause diffusion of the metals, and forming the strip into an accordion-like pile with the hot junctions on one side and the cold junctions on another side.

16. The method of making the generating unit of a thermo-electric generator which consists in forming the unit in a continuous strip of metal, depositing a different metal upon alternate portions thereof, heating the strip to cause diffusion of the metals, depositing a second different metal upon the remaining portions of the strip, heating the strip to cause diffusing of the metals, and forming the strip into an accordion-like pile with the hot junctions on one side and the cold junctions on another side.

In witness whereof I affix my signature.

CHARLES W. WOODRUFF.